May 1, 1951
F. B. YINGLING
2,551,307
TURBOCHARGED TWO-CYCLE ENGINE WITH LIQUID COOLED EXHAUST DUCTS
Filed Oct. 14, 1944
5 Sheets-Sheet 1
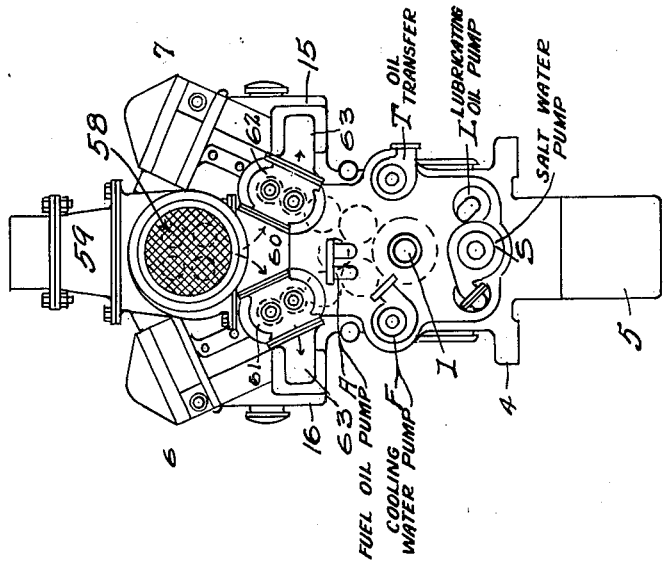
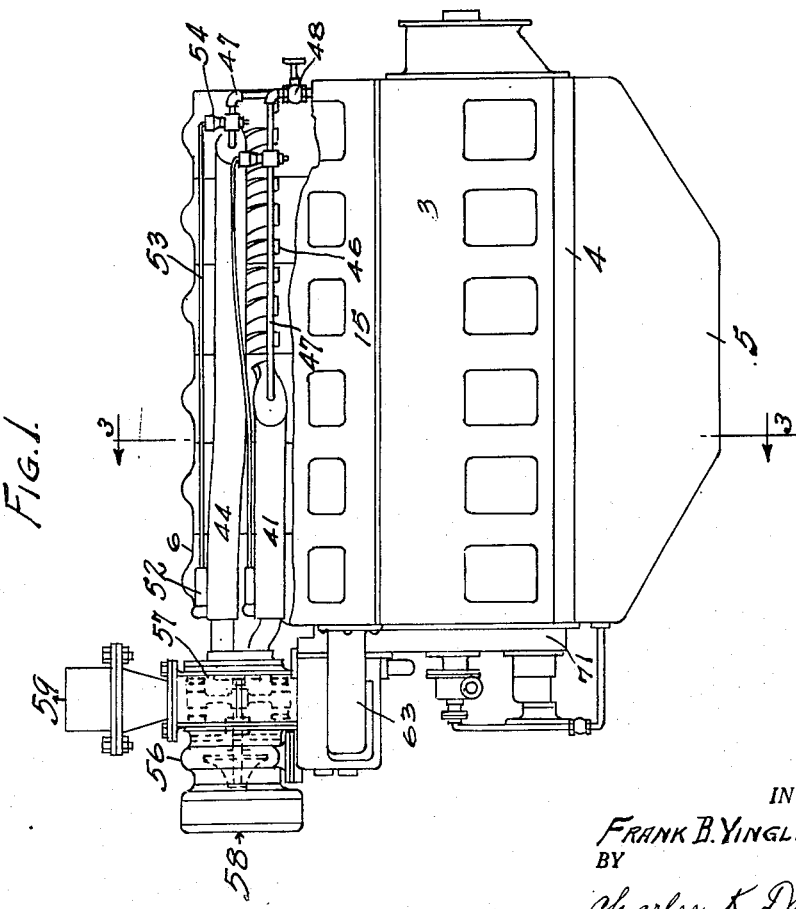
INVENTOR.
FRANK B. YINGLING
BY
Charles K. Davies

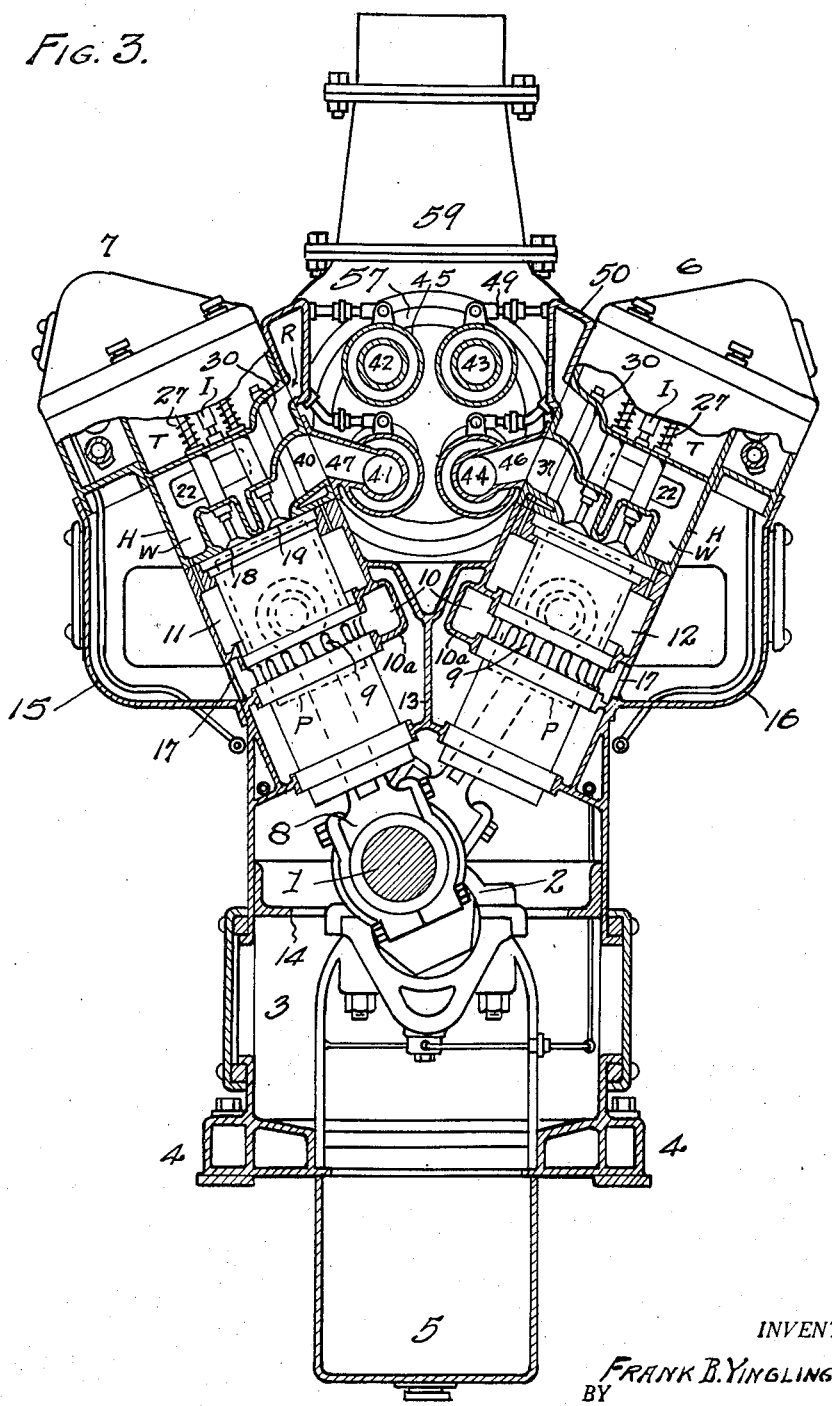

INVENTOR.
FRANK B. YINGLING
BY
Charles K. Davies

Patented May 1, 1951

2,551,307

UNITED STATES PATENT OFFICE 2,551,307

TURBOCHARGED TWO-CYCLE ENGINE WITH LIQUID COOLED EXHAUST DUCTS

Frank B. Yingling, Hamilton, Ohio

Application October 14, 1944, Serial No. 558,705

9 Claims. (Cl. 60—13)

This application is a continuation-in-part of the subject matter of my pending application for patent, Ser. No. 432,700, filed Feb. 27, 1942 (now abandoned).

The invention relates generally to improvements in two-cycle internal combustion engines of the compression ignition type adapted for embodiment in stationary and marine engines, as well as in engines for transportation purposes. The improvements of the invention are applicable to engines with in-line cylinders, but for convenience of illustration a V-type engine is employed in which one or two rotary positive displacement blowers are co-ordinated with the single crank shaft of the engine, and the operation of the blowers is controlled together with the operation of the engine so that the necessary supply of air for scavenging purposes and for fuel purposes is constantly maintained. In addition to the blower or blowers that are engine operated to supply the normal air pressure to the cylinders, I also utilize a turbo-supercharger which forms the air-intake, through the blowers, for the engine, the supercharger being operated by kinetic energy of the exhaust gases flowing from the engine cylinders, to raise the normal air pressure of the engine operated blowing appliance, and thus increase the air pressure supplied to the cylinders, and enhance the brake mean effective pressure of the engine. The supercharger actuated by the kinetic energy is arranged to superimpose additional air pressure on the normal air pressure created by the positive displacement blowing appliance; and thermal operated control means are provided for preventing excessively high temperatures of the exhaust gases utilized in the supercharger.

In carrying out my invention in combination with a multicylinder engine having an air duct for the cylinders, and an engine operated blower for the air duct, I utilize the supercharger for supplying air to the blowing appliance, and a coolant is controlled by thermal actuated means to prevent excessive degrees of heat passing through the supercharger that would result in damage to its working parts.

When two engine-operated rotary positive displacement blowers are employed for the normal air pressure to the cylinders of a two-cycle engine the pressure may be from three to five pounds for maintaining the desired load fed to the cylinders when the engine is operating under usual conditions. If and when the supercharger is used in combination with the engine operated blower or blowers, the pressure of air for scavenging the cylinders and for supplying the fuel air for combustion may be increased to six to ten pounds or more pressure. By the embodiment of my invention in a V-type two cycle engine, and when twin rotary positive displacement blowers are employed under normal conditions for supplying air to the cylinders or cylinder housings of the engine, a maximum brake mean effective pressure of say eighty pounds may be maintained; while on the other hand, with the added use of the exhaust operated supercharger the brake mean effective pressure may be increasd to approximatly one hundred and twenty pounds or more per square inch.

In addition to the protection from excessive heat afforded by the automatic thermal control, I also provide the cylinder heads in which the exhaust valves are mounted, with means for conveying a single gas current from each of the exhaust ports of each cylinder, thereby preventing the accumulation of excessive heat at any one point in the heads, thus holding the temperature of the gas currents below a damaging point. This control of heat permits the use of the supercharger for supplying scavenging air and fuel air to the cylinders at comparatively higher pressures, resulting in an increase of power for the same relative size and weight of an engine. For this purpose the engine cylinders are thoroughly cleared of exhaust gas, and the exhaust gas from each port is conveyed in a single current or stream by the direct one-way or uniflow system of air feed through the cylinders, the gas currents being separately maintained until they mingle in one or more exhaust manifolds, through which they flow to the supercharger.

Figure 1 is a view in side elevation of a two cycle compression ignition internal combustion engine in which my invention is embodied, the near bank or row of cylinders of the engine being broken away to facilitate illustration of the exhaust manifolds, and the thermal control arrangements.

Figure 2 is an end elevation of the engine as seen from the left in Figure 1, showing the arrangement of the turbo-supercharger or compressor, the rotary positive displacement blowers, and other equipment at the front of the engine.

Figure 3 is an enlarged, detail, vertical sectional view, as at line 3—3 of Figure 1 showing the interior construction and relation of various parts of the engine.

Figure 4:
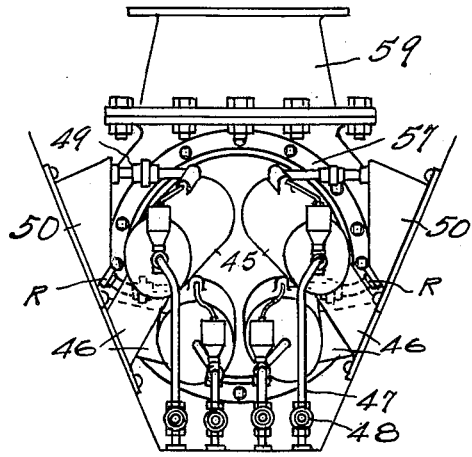
Figure 4 is a detail elevation at the rear end of the engine depicting the exhaust manifolds combined with the supercharger, the water connections for the manifolds, and the metering or thermostatic devices for controlling circulation of the coolant around the several manifolds.

It will be understood that the coolant for the exhaust manifolds depends upon the capacity and size of the engine with which they are equipped, the top rated horse-power of the engine, and other factors. In some instances where the engine is working at normal capacity the thermostatic controls prevent circulation of the coolant through the jackets of the manifolds. Whereas, should the engine be working over capacity with a consequent creation of high degrees of temperature, the automatic controls act to allow circulation of the coolant.

In the assembly views Figures 1, 2, and 3, the crank shaft 1 of the engine is journaled in bearings 2 within the crank case 3 which is fashioned with attaching flanges 4 for bolting the engine in place, and the bottom of the housing is shown with an oil sump 5. For purposes of illustration and convenience the invention is embodied in a V-type compression-ignition engine with six cylinders in each of its rows or banks 6, and 7, respectively, and each cylinder is provided with a connecting rod assembly 8, and dotted piston P. For the uniflow system of air supplied to the interior of the cylinders of the engine, and as shown in Figure 3, they are fashioned with an annular series of airports 9 for co-operating with the reciprocating piston P in controlling the air feed to the cylinders. In the uniflow air system the power stroke of the piston opens the ports 9, and these intake air ports 9 are closed by the piston on its return stroke or compression stroke. These ports receive air under pressure through a surrounding charge chamber 10 formed within the closed annular wall 10a, and the cylinders, together with the charge chambers, are mounted in duplex water compartments 11 and 12 that extend longitudinally from end to end of the engine.

Each row of cylinders, including the water compartments, is provided with a suitable source of supply, as are also the water spaces or chambers W, so designated throughout the headers H, and other parts of the engine. The walls of these two water compartments are arranged in the planes of the two respective rows of cylinders 6 and 7, and the lower parts of the compartments may be separated by a vertical partition 13. The walls of the compartments, the crank case, braces, and plates forming a rectangular angle frame 14 within the crank case, all form parts of a unitary engine housing that is strengthened and braced to withstand strains, vibrations, and stresses due to the operation of the engine; and the cylinders in their housings 11 and 12 are rigid with the engine housing as a whole.

Air under pressure for scavenging purposes, and for fuel, is supplied to each row of cylinders through an air duct or receiver, as 15 and 16, extending longitudinally from end to end of the engine and along the outer sides of the two cylinder housings 11, and 12. The walls of these airducts 15 and 16 are also rigid with the unitary engine housing, and air under pressure is supplied from these exterior ducts through ports 17 that open into the respective annular air chambers or charge chambers 10 that surround the annular series of ports 9 of the cylinders.

Directly above each cylinder in the two rows 6 and 7 of the engine is mounted a header H forming the cylinder head; and each of these headers is fashioned with a group of four exhaust ports 18, 19, 20 and 21, opening up from the combustion chamber in the upper end of the cylinder, through the bottom wall of the header. Each header is fashioned with interior water cooling chambers or spaces W, and adjoining walls of adjacent headers are provided with ports 22 to insure circulation of the coolant throughout each row of cylinders and their headers, from the water trough 11 or 12 below the cylinder headers and through communicating ports.

The exhaust ports 18, 19, 20, 21, are controlled by four complementary valves 23, 24, 25, and 26, forming a group about the center of the header, and each of these groups of valves is operated by a valve operating unit or assembly indicated as a whole by the numeral 27, mounted in a casing T in the upper part of the header above the valve casing. These valves are depressed to open position with relation to the combustion chamber located beneath them in the upper end of the cylinder, and springs are employed to lift the valves to closed position in their ports.

The exhaust ports are opened by the valve-operating means when piston P is near to or approaching the bottom of its stroke, and the gas of combustion under pressure immediately flows upwardly through the open exhaust ports. Just as the exhaust gas is released by the valves and expands upwardly through the ports, the air intake ports 9 are opened by the passing of piston P on its descent, and air under pressure from the ducts 15 and 16 passes up through the cylinder expelling any residual exhaust gas, and also supplying the charge of air under pressure for combustion. As the piston compresses air in the combustion chamber, fuel oil is supplied by the injection unit indicated as a whole, by the letter I in Figure 7, and located in the casing T of the header H, at the center of the combustion chamber.

Figure 7:
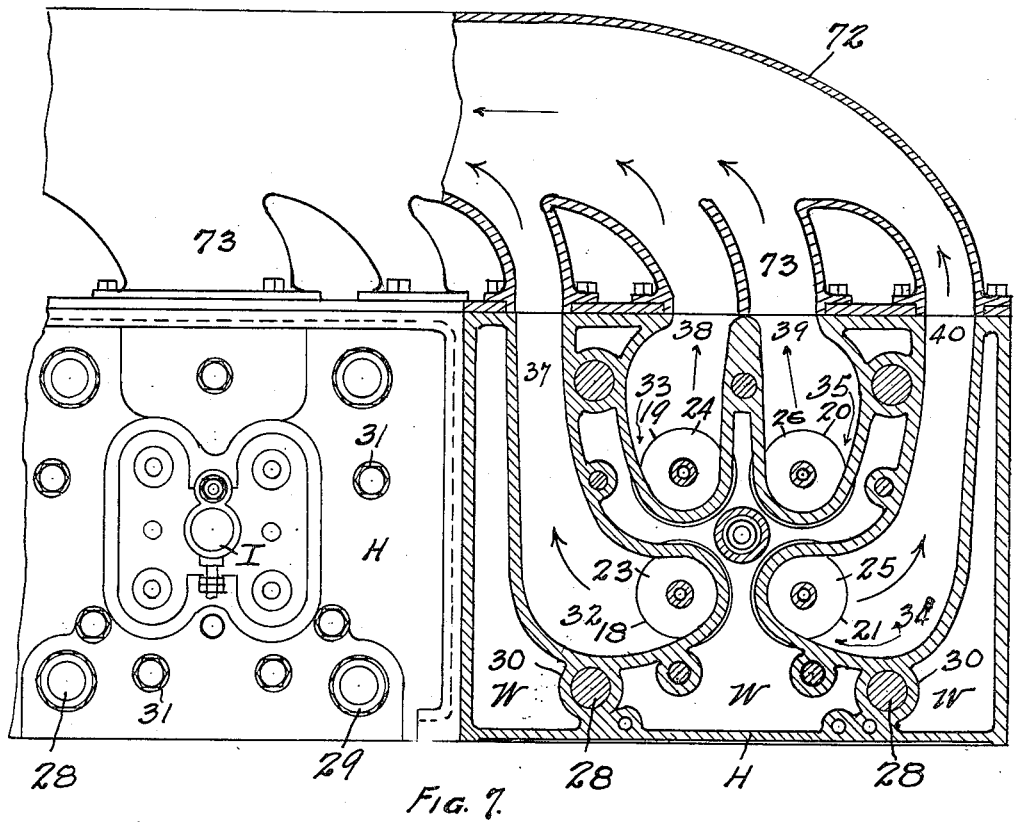
Figure 7 is an enlarged detail horizontal sectional view of one of the removable headers or cylinder heads, with its exhaust ports, valves, cells and flues; and also showing in top plan view an adjoining header, both headers being connected to an exhaust manifold that is not water cooled.

Each of the removable headers H, as indicated in Figure 7, is fastened by large bolts 28, and nuts 29 rigidly with the unitary housing, and these bolts pass down through tubular bosses 30 of the header, nuts 31 being used to fasten the removable header rigidly with its cylinder.

As best seen in Figure 7, within the interior of the hollow header, and above each of the exhaust valves, is fashioned a cell as 32, 33, 34, 35, each of which merges at one side with a discharge flue as 37, 38, 39 and 40, through which the separated currents of exhaust gas are discharged from the exhaust ports of the valves; and each of these discharge flues conveys a single stream or current of exhaust gas to an exhaust manifold.

In this exemplifying embodiment of the invention I prefer to employ four exhaust manifolds as 41, 42, 43, and 44, each fashioned with a water jacket 45, and branch flues or ports 46 and 47, the latter registering with the exhaust flues 37, 38, 39 and 40 of a header. The manifolds are located between the two rows of cylinders at the inner sides of the cylinders, opposite to the airducts that extend along the outer sides of the rows of cylinders. Two short manifolds 41 and 42, each receives exhaust gas from three headers at opposite sides of the longitudinal center of the engine, and the two longer manifolds, 43 and 44 each receives exhaust gas from the other three headers at opposite sides of the longitudinal center of the engine.

This specific arrangement is used with V-engines having rows of six cylinders, and the exhaust from the different cylinders is successively arranged so that the exhaust from one cylinder will not interfere with the flow of exhaust gas from another cylinder, thus not only preventing back pressure from the expanding gas, but insuring uniform streams or currents of exhaust gas passing out at the distant end of an exhaust manifold. It will be understood that other combinations and arrangements of cylinders in a row will change the number of cylinders exhausting into a manifold; for instance, with nine cylinders to a row three cylinders would exhaust into each of three separate manifolds for each row.

This arrangement of the manifolds and their branch flues, adapted to serve specific groups of cylinders, provides for a compact arrangement between the cylinder housings, and insures a thorough clearance of exhaust gases from each of the cylinders, together with charging of the cylinders with fresh air by the uniflow system to accomplish the direct one-way flow of scavenging air through the combustion chambers of the cylinders.

Preferably the exhaust manifolds and their surrounding jackets are cylindrical in cross section, but of course the shape, dimensions and size of the manifolds may be changed as desirable or necessary. Each water jacket 45 has a water pipe 47 communicating with a suitable part of the water circulating system of the engine, as for instance, one of the water compartments 11, or 12, and each pipe is provided with a cut-off valve 48, manually operated or adjusted to regulate the flow of water through the water jacket; or to cut off the flow entirely, in case the cooling of water in the jacket is not desirable.

At the inner end of the water jacket I provide a water pipe 49 that projects laterally from the jacket to a receiving tank 50, one of which tanks is mounted on the inner side of each longitudinally extending cylinder housing near the front end of the engine; and as best indicated in Figure 3, a port R opens from the lower end of each of these tanks into a water compartment W in a header.

Water is circulated for the cooling systems of the engine from a pump F in Figure 2, and for marine use a salt-water pump S is indicated to supply water to an appliance (not shown) that cools the circulating water of the cooling systems of the engine. Figure 2 also discloses a fuel-oil pump A, lubricating oil pump L, and an oil transfer T, all of which appliances are properly connected to different parts of the engine for the proper performance of their functions.

Figure 6:
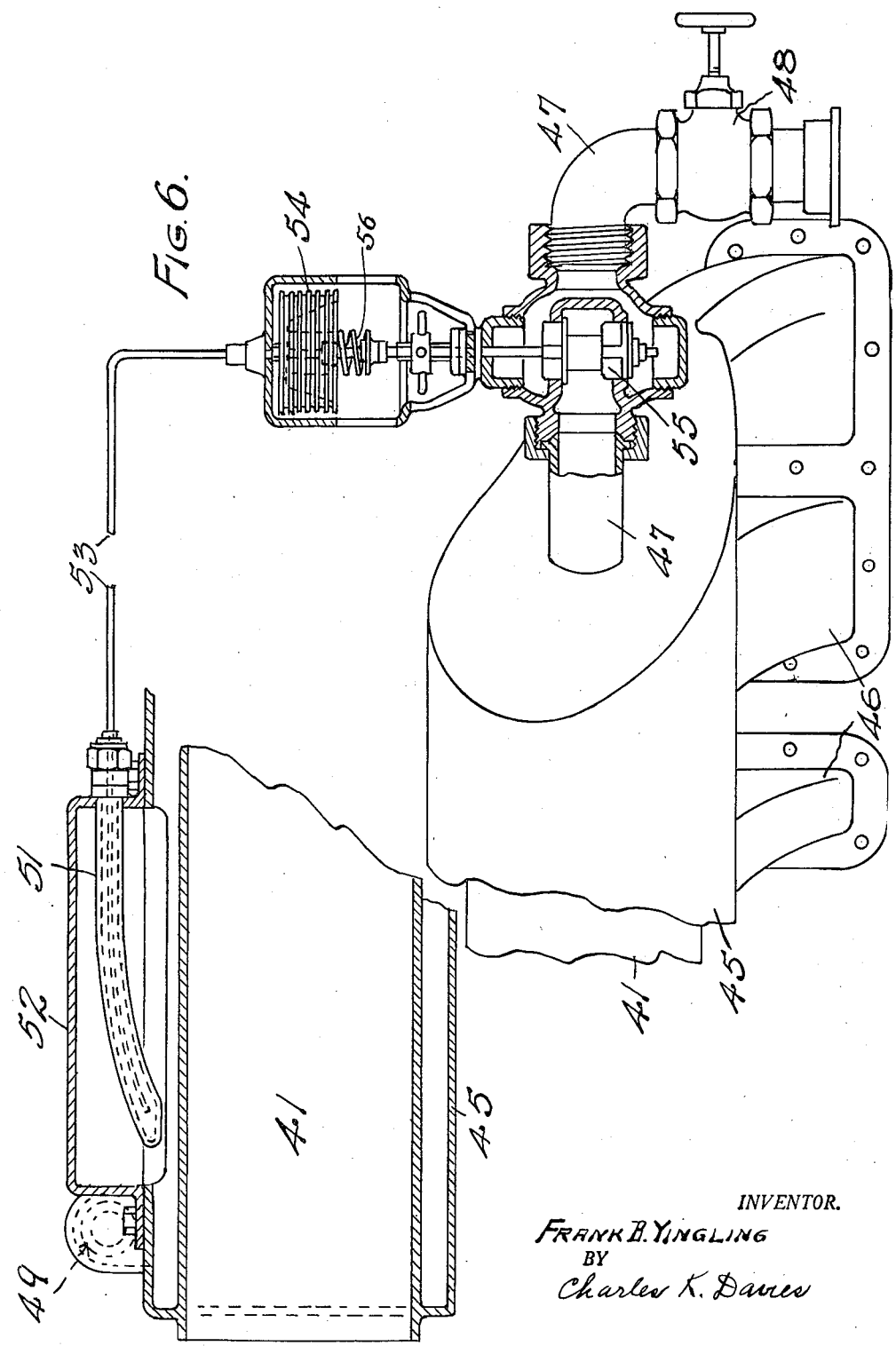
Figure 6 is a broken view, partly in full and partially in section, of one of the exhaust manifolds, together with a sectional detail view of one of the thermal actuated control valves for the coolant of the exhaust manifold illustrated.

For automatically controlling the circulation and flow of cooling water within the water jackets of the exhaust gas manifolds I may utilize any suitable heat-controlled or thermal actuated device, one of which is shown in detail in Figure 6, in its relation to the manifold and jacket, and inasmuch as the construction and operation of all of the devices are similar, a description of one device will suffice for all of the devices or appliances.

A thermostat 51 is enclosed in a housing 52 mounted on the exterior of the water jacket and open to the interior of the jacket so that the thermostat is in contact with the water flowing through the jacket. The thermostat thus subjected to heat within the jacket is connected in a closed circuit including a pipe 53, or armored flexible tubing, one open end of which terminates below the liquid level in the enclosing bulb. The other end of the tubing communicates with the interior of a bellows 54 that forms a motor which governs a valve 55 in pipe 47 and regulates flow of water through the water jacket of the manifold. The stem of the valve is fixed to the lower end of the bellows so that it partakes of the movement of this portion of the bellows in raising and lowering the valve in its seat.

The bellows, tubing, and bulb, contain a thermo-sensitive liquid, which, under heat of water within the housing 52 generates vapor in the bulb, and pressure from this expanding vapor is transmitted through the liquid in the tubing and bellows to depress and open the valve for circulation of water. Expanding pressure of the vapor opens the valve through the expansion of the bellows, and contraction of the bellows, together with a return spring 56, automatically closes the valve.

Each of the water jackets is provided with the thermal device and servo-motor controlled valve, the thermostats being set at a uniform maximum temperature to operate, and govern or regulate the circulation of the coolant.

The kinetic energy inherent in the exhaust gases is utilized to operate a turbo-compressor or supercharger 56; the four exhaust manifolds being connected, as shown, with the exhaust turbine 57 of this compressor which is mounted in elevated position at the front end of the engine. The air intake 58 for the turbo-compressor or supercharger, which forms the initial and sole air intake for the engine, is located at the front end of the appliance, and the separated exhaust intake of the turbine is located at the rear end of the appliance; the exhaust gas after exerting its kinetic energy to drive the turbo-compressor passing upwardly through the outlet 59.

Figure 5:
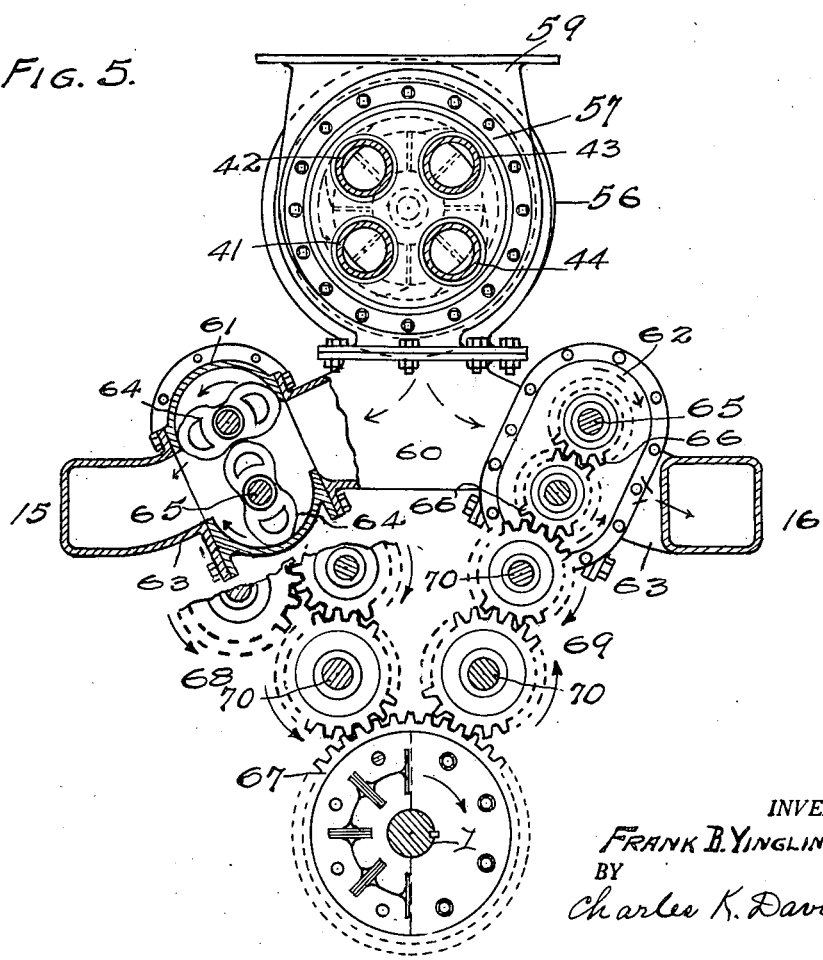
Figure 5 is a diagrammatic view, partly in section, and partially broken away, showing the flexible train of gearing from the crank shaft for operating the positive displacement blowing appliance, and illustrating its relation to the air ducts and supercharger.

Air currents entering the intake 58 of the supercharger are forced by centrifugal action downwardly from the compressor and through a central double-end connection 60, as best seen in Figure 5, thence into the casings 61 and 62 of a pair of rotary positive displacement blowers, one for each duct 15 and 16, at the outer sides of the engine. Each casing is connected with an air duct through a hood, as 63, and the arrows in Figures 2 and 5 indicate the flow of air under pressure from the intake 58 into the air ducts.

By this utilization of the kinetic energy in the turbo supercharger, air is taken through the single intake at atmospheric pressure and supplied under pressure to the positive displacement blowers, eliminating suction that would of necessity be present at the intake side of the positive displacement blowers.

When the positive displacement blowers are operated from the engine shaft and the supercharger is idle, air is taken in through the supercharger and the double-end connection to the spaced blowers.

When the supercharger and the positive displacement blowers are both operating, the first under kinetic energy, and the second under power from the crank shaft, from the single intake, a large volume of air is taken by the supercharger, compressed, and delivered to the positive displacement blowers, which blowers raise the required effective pressure of the charging air delivered to the air ducts. This supply of compressed air from the supercharger to the positive displacement blower relieves the load on the crank shaft that is necessary to initially operate the positive displacement blowers, thus increasing the available horse power of the engine together with its efficiency. In addition, and due to the fact that these rotary positive displacement blowers are connected by the train of operating gears with the crank shaft, the supercharger 56 is capable of operating the blowers by blowing air therethrough toward the air ducts. The power in the kinetic energy of the exhaust gas which is utilized to operate the supercharger is not deducted from the useful power of the engine, but on the other hand this utilized power is deducted from the kinetic energy of the exhaust gas.

Thus, in a two-cycle, uniflow engine I supply an increased volume and pressure of scavenging and combustion air, to the cylinders, which enhances the combustion of the fuel mixture in the cylinders, and reduces the relative quantity of fuel oil required for combustion, thereby economizing in the operation of the engine.

In starting the engine, the positive displacement engine-operated blowers taking air from the single intake 58, immediately charge the cylinders with compressed air for combustion purposes and scavenging purposes. After the engine is running and while the positive displacement blowers continue to charge the cylinders, not only is the engine power conserved by the use of the kinetic energy in the supercharger, in combination with the blowers, but, in addition, a larger output or capacity of the engine power is available for use, due to the decreased power required of the crank shaft for operating the positive displacement blowers.

When both the supercharger and the positive displacement blowers are operating in combination, and the kinetic energy of the exhaust gas develops sufficient volume and power in the supercharger to provide fluid pressure against the impellers or rotors of the blowers, the latter are directly driven by such fluid pressure, so that the positive displacement blowers now perform the functions of motors, transmitting power from the rotors, back through the train or trains of operating gears, to the crank shaft 1, as indicated in Figure 5.

The rotors or impellers 64 of the positive displacement blowers revolve with their shafts 65, each blower having a pair of operating pinions 66. Power is supplied from the crank shaft 1 through a flexible coupled drive wheel 67, thence through the two trains of operating gears indicated as 68 and 69, rotating with their shafts 70, all of which are provided with suitable journal bearings within the gear casing 71 of Figure 1.

While I have illustrated one arrangement for trains of operating gears between the engine shaft and the rotary positive displacement blowers, it will be understood that the transmission of power from the engine shaft to a blower, or to twin blowers, may be changed to meet varying conditions.

Likewise, after the manually controlled valves 48 have been adjusted to govern the desired flow of cooling water, and the thermal controlled appliances thereafter prevent excessive heating, or overheating of parts, especially in the supercharger; under some conditions the use of these appliances may not be necessary.

Should it be desirable to utilize the exhaust manifolds for conveying the exhaust gas to the supercharger without recourse to the cooling of the exhaust gas in the manifolds, the automatic cooling appliances may be omitted. Thus, in Figure 7, the exhaust manifold indicated by the numeral 72 is provided with branch flues 73 complementary to the flues 37, 38, 39, and 40 of the header H, and the cooling jacket is omitted.

Having thus fully described my invention, what I claim as new and desire to secure by Letters Patent is:

1. In a two-cycle V-type multi-cylinder internal combustion engine having exterior longitudinally extending air ducts, an engine-operated blower for each duct, and liquid coolant compartments, the combination with an air supercharger forming the intake and supplying air to said blowers, four central longitudinally extending exhaust manifolds connecting the engine with the supercharger, liquid cooling jackets surrounding said manifolds, two spaced tanks communicating with the liquid-coolant compartments of the engine and connections between said tanks and jackets, and means for controlling circulation of said liquid-coolant.

2. In a two-cycle V-type multi-cylinder internal combustion engine having a liquid-coolant system including exterior longitudinally extending air ducts for the cylinders and an engine operated blower mounted transversely of the air ducts at one end of the engine for each duct, a single intake hood uniting the blowers, and a turbo-supercharger mounted on the hood and forming the air intake for the blower, the combination of a plurality of exhaust manifolds connecting the cylinders with the turbo-supercharger, jackets surrounding the manifolds and connected with the system, means for closing said jackets against circulation of the liquid coolant, and thermal-actuated means responsive to temperature changes within the liquid coolant system for opening said last means, whereby excessive heat in exhaust gas is prevented from entering the turbo-supercharger.

3. In a multi-cylinder two-cycle internal combustion engine having a liquid coolant system, an engine operated blower and an air duct communicating with the cylinders, the combination with a supercharger forming an air intake in communication with the blower, and an exhaust manifold connecting the cylinders with the supercharger, of a liquid coolant jacket on the manifold communicating with the system, automatic means including a valve adapted to open and close communication between the jacket and said system, and thermal actuated means responsive to temperature changes within the liquid cooling syster for effecting opening of the valve.

4. In a multi-cylinder two-cycle compression ignition V-type internal combustion engine having longitudinally extending exterior air ducts communicating with the cylinders, an engine operated positive displacement blower for each of the air ducts mounted transversely of the ducts at one end of the engine, and a single intake hood opening to said blowers, the combination of a supercharger mounted on and supplying air under pressure to said intake hood, and means whereby the turbo-supercharger is operated by kinetic energy of exhaust gas from the cylinders.

5. In a multi-cylinder two-cycle engine having longitudinally extending air ducts, an engine-operated positive displacement blower for each duct, and a single intake hood uniting said blowers, a turbo-supercharger mounted on and supplying air under pressure to said hood, exhaust manifolds conected to the supercharger, and separate means for conveying exhaust gas currents from the ports of the cylinders to said manifolds.

6. In a two-cycle V-type multi-cylinder engine having exterior longitudinally extending air ducts for the cylinders and an engine operated positive displacement blower for each duct arranged transversely of the engine, said engine having a plurality of inner exhaust ports and separated flues extending from said ports, the combination with an air supercharger mounted over and forming the intake for supplying air under pressure to said blowers, a plurality of centrally arranged longitudinally extending exhaust manifolds connected to said supercharger, and complementary, separated, branch flues uniting the first mentioned flues with the manifolds.

7. In a multi-cylinder two-cycle engine having a longitudinally extending air duct and an engine-operated positive displacement rotary blower for supplying air under pressure to the duct, the combination with a supercharger operated by kinetic energy of exhaust gas from the cylinders and forming the air intake for supplying air to the blower, an exhaust manifold connecting the engine with the supercharger, a water jacket surrounding the manifold, and thermal-actuated means responsive to changes in temperature of liquid within the jacket for controlling circulation of cooling liquid through said jacket.

8. In a multi-cylinder two-cycle engine having an air duct for the cylinders and an engine operated positive displacement rotary blower mounted transversely of the duct at one end of the engine within its lateral dimensions, the combination with a supercharger operated by kinetic energy of exhaust gas and forming the intake for supplying air to said blower, an exhaust manifold connecting the engine with the supercharger, cooling means for reducing the temperature of exhaust gas in the manifold, and thermal-actuated means for controlling said cooling means responsive to differential temperatures within the cooling means.

9. In a multi-cylinder two-cycle engine having an air duct for the cylinders, the combination with an engine operated rotary positive displacement blower and a supercharger forming the air intake for the blower and operated by kinetic energy of exhaust gas for supplying air under pressure to the blower, an exhaust manifold connecting the cylinders and the supercharger, a water jacket for the manifold, and thermal-actuated means responsive to changes in temperature within the jacket for controlling the circulation of a liquid coolant through said jacket.

FRANK B. YINGLING.

REFERENCES CITED

The following references are of record in the file of this patent:

UNITED STATES PATENTS

| Number | Name | Date |
|---|---|---|
| 1,181,144 | La Porte | May 2, 1916 |
| 1,528,568 | Roof | Mar. 3, 1925 |
| 1,553,854 | Fornaca | Sept. 15, 1925 |
| 1,644,029 | Porsche | Oct. 4, 1927 |
| 1,874,681 | Woolson | Aug. 30, 1932 |
| 2,113,077 | Büchi | Apr. 5, 1938 |
| 2,238,889 | Kollmann | Apr. 22, 1941 |
| 2,296,268 | Büchi | Sept. 22, 1942 |
| 2,401,677 | Yingling | June 4, 1946 |

FOREIGN PATENTS

| Number | Country | Date |
|---|---|---|
| 244,032 | Great Britain | Mar. 18, 1926 |
| 369,033 | Great Britain | Mar. 17, 1932 |
| 427,938 | Great Britain | May 2, 1935 |
| 684,902 | France | Mar. 24, 1930 |